US005360191A

United States Patent [19]

Carson et al.

[11] Patent Number: 5,360,191

[45] Date of Patent: Nov. 1, 1994

[54] BANNISTER ATTACHMENT ESPECIALLY ADAPTED FOR FACILITATING THE MOUNTING OF A CHILD SAFETY GATE

[76] Inventors: Randy N. Carson; Marion E. Carson, both of 47 Deerfield Circle SE, Calgary, Alberta, Canada, T2J 6L7

[21] Appl. No.: 952,958

[22] Filed: Sep. 29, 1992

[51] Int. Cl.[5] .......... F16B 1/00

[52] U.S. Cl. .......... 248/218.4; 258/297.2; 256/65

[58] Field of Search .......... 248/297.2, 218.4; 256/1, 65

[56] References Cited

U.S. PATENT DOCUMENTS

| | | | |
|---|---|---|---|
| 124,105 | 2/1872 | Wilson | 256/22 |
| 2,193,200 | 3/1940 | Menutole | 248/297.2 X |
| 3,817,394 | 6/1974 | Saiki | 248/218.4 X |
| 3,975,916 | 8/1976 | Watson | 256/1 X |
| 4,390,165 | 6/1983 | Murdock | 256/24 |
| 4,548,388 | 10/1985 | Cobler | 256/1 X |
| 4,677,791 | 7/1987 | Larson et al. | 49/463 |
| 4,809,955 | 3/1989 | Veilleux | 256/65 |
| 4,923,176 | 5/1990 | Heinz | 256/65 |
| 5,046,705 | 9/1991 | Williams | 256/36 |
| 5,190,268 | 3/1993 | Espinueva | 256/65 X |

*Primary Examiner*—Richard K. Seidel
*Assistant Examiner*—Kenneth E. Peterson
*Attorney, Agent, or Firm*—Jerry T. Kearns

[57] ABSTRACT

A bannister attachment especially adapted for facilitating the mounting of a child safety gate includes a longitudinally extending body member possessing on a front face two spaced, substantially parallel rails defining a central recessed mounting channel adapted for releasably receiving extensible abutment feet extending from a side edge of a conventional child safety gate. Top and bottom box frame members secured to the elongated body member are selectively mountable around the end post of a bannister of a stairway to semi-permanently secure the bannister attachment at the head of a stairway. The bannister attachment provides a safe, secure, and ornamentally attractive device for facilitating the mounting of a conventional child safety gate.

20 Claims, 4 Drawing Sheets

BANNISTER ATTACHMENT ESPECIALLY ADAPTED FOR FACILITATING THE MOUNTING OF A CHILD SAFETY GATE

BACKGROUND OF THE INVENTION

1. Field of the Invention

A conventional type of child safety gate enjoying a great deal of popularity and widespread use includes two partially overlying relatively slidable partition portions interconnected for extensible movement and adapted to be mounted across the entrance of a stairway to prevent small children from falling down the stairs. One example of this type of safety gate is sold under the trademark "FISHER PRICE". This type of child safety gate includes extensible abutment feet extending from one side edge adapted for selectively releasable engagement with the side edge of a doorway or a wall disposed adjacent to the entrance of a stairway. Unfortunately, certain types of stairways do not terminate at either the upper or lower end in a suitably defined doorway or other area providing suitable abutment surfaces for engagement with the abutment feet on one or both sides of the child safety gate. For example, one stairway of this type terminates at one side in a vertical wall surface and at an opposite side in a bannister end post having a cylindrical or other irregular configuration. Accordingly, it is impossible to securely mount the child safety gate to the irregularly curved bannister end post.

2. Description of the Prior Art

A wide variety of child safety gates and similar fence and partition constructions have been proposed in the prior art. However, none of these prior art partitions and fenced constructions is susceptible for a rapid and aesthetic ornamental mounting on an end post of a conventional banner to facilitate the safe and secure mounting of a child safety gate.

SUMMARY OF THE INVENTION

In order to achieve these and other objects of the invention, the present invention provides an improved bannister attachment especially adapted for facilitating the mounting of a child safety gate which includes a longitudinally extending body member possessing on a front face two spaced, substantially parallel rails defining a central recessed mounting channel dimensioned for releasably receiving extensible abutment feet extending from a side edge of a conventional child safety gate. Top and bottom box frame members secured to the elongated body member are selectively mountable around the end post of a bannister of a stairway to semi-permanently secure the bannister attachment at the head of a stairway. The bannister attachment provides a safe, secure, and ornamentally attractive device for facilitating the mounting of a conventional child safety gate.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

DETAILED DESCRIPTION OF THE PREFERRED EMBODIMENT(S)

Figure 1:
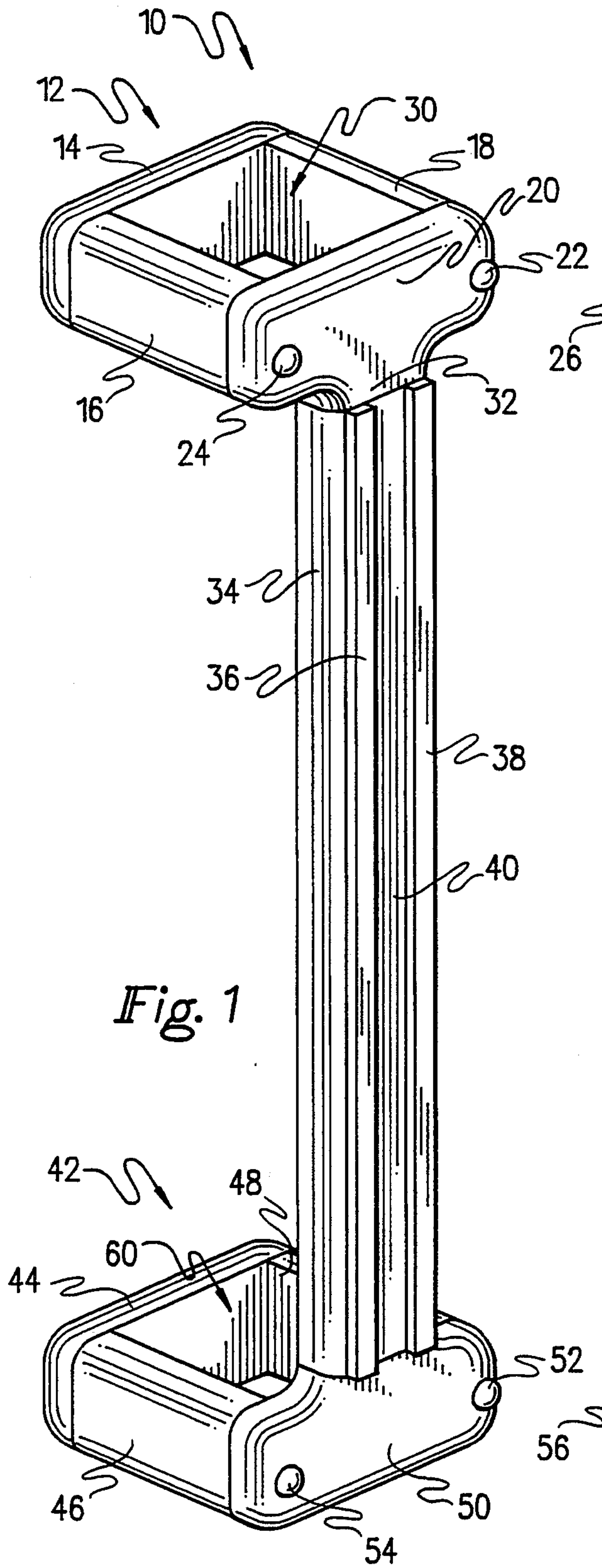
FIG. 1 is a front side perspective view illustrating the bannister attachment of the present invention.
Figure 2:
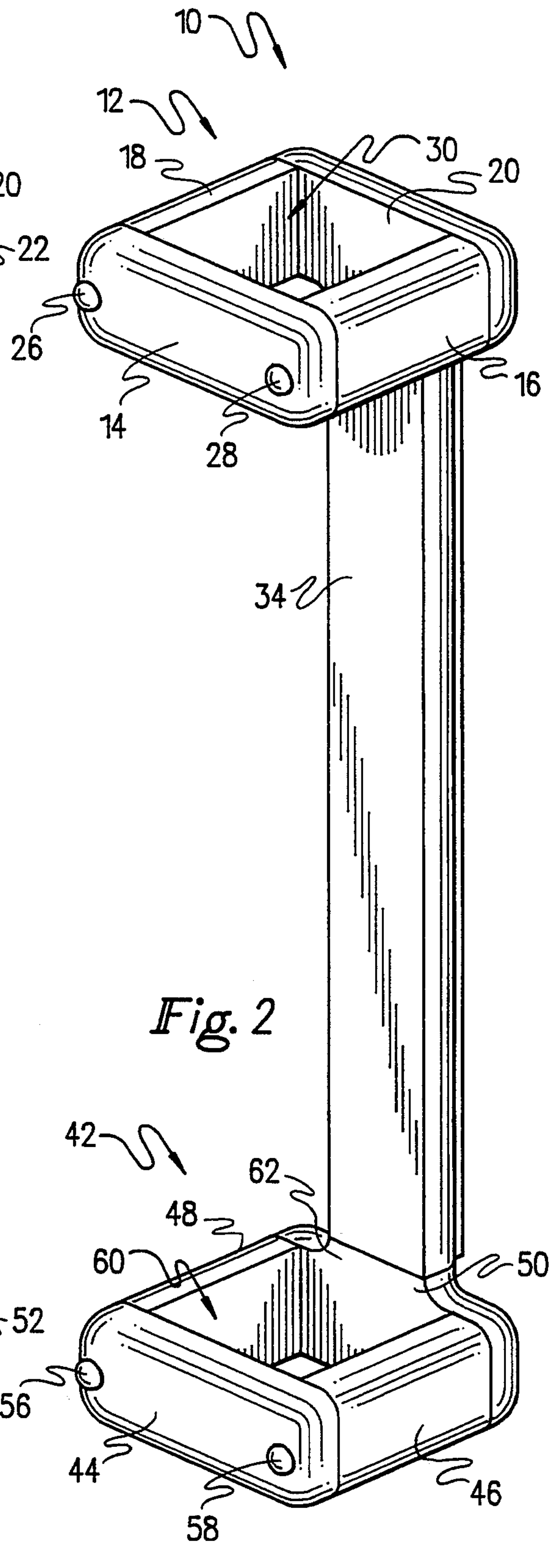
FIG. 2 is a rear side perspective view illustrating the bannister attachment of the present invention.
Figure 3:
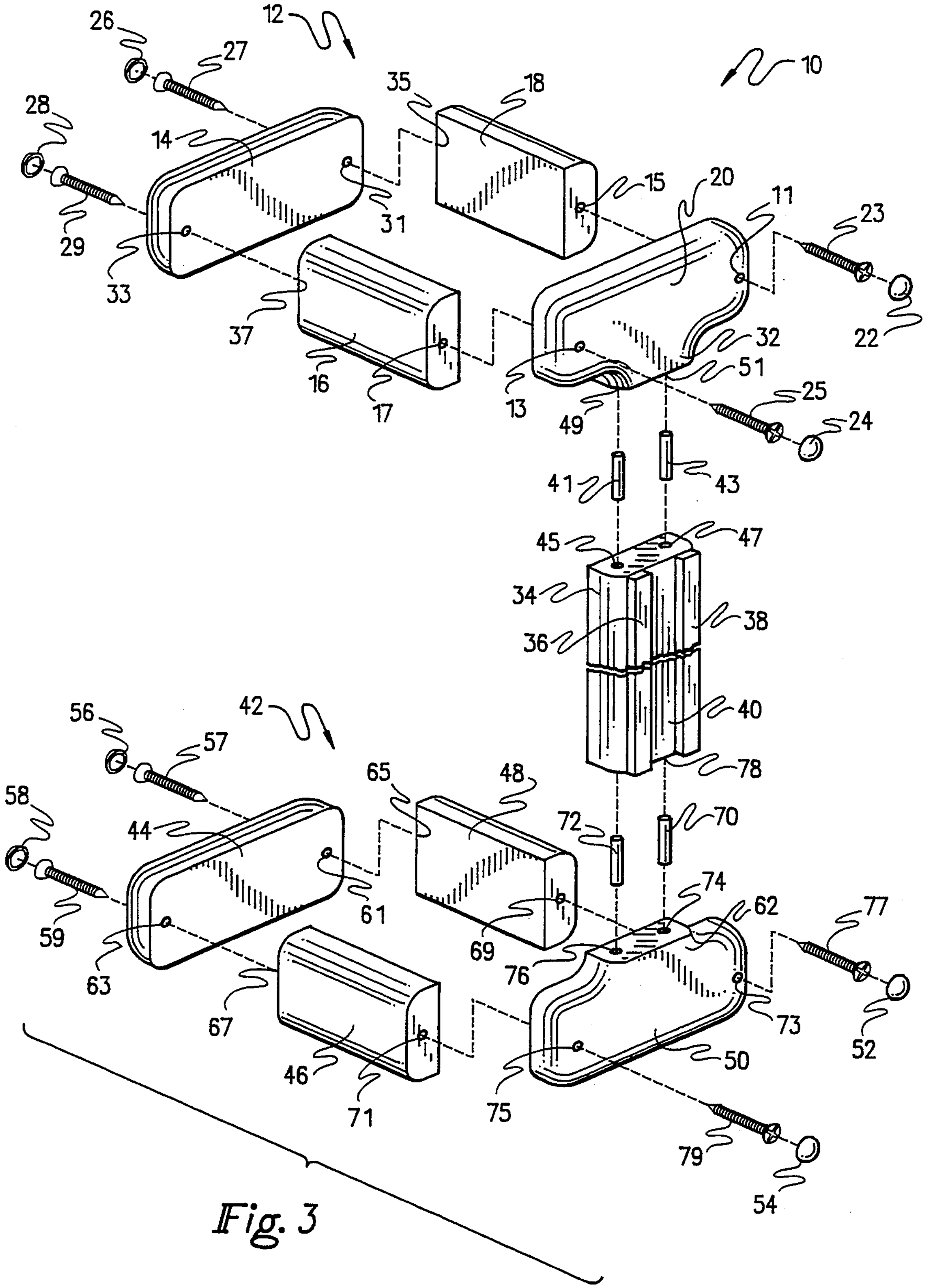
FIG. 3 is an exploded perspective detail view illustrating the bannister attachment of the present invention.
Figure 4:
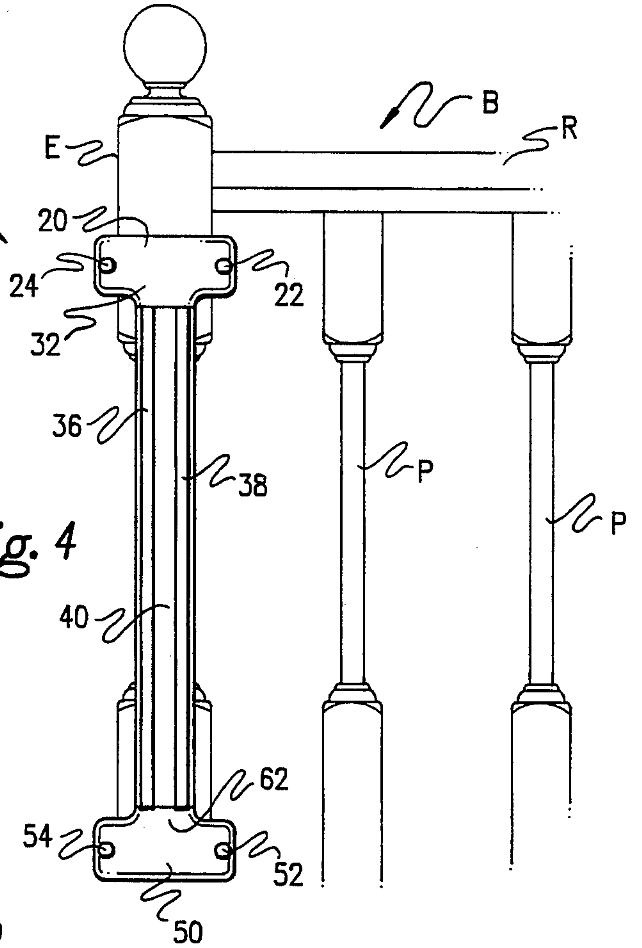
FIG. 4 is a front elevational view illustrating the bannister attachment of the present invention installed on a bannister end post.

Referring now to the drawings, wherein like reference numerals designate corresponding structure throughout the views, and referring in particular to FIGS. 1 through 3, a bannister attachment 10 according to a preferred embodiment of the invention will now be described. The bannister attachment 10 includes an upper or top box frame mounting assembly 12 possessing substantially parallel juxtaposed end frame members 14 and 20, as well as side frame members 16 and 18. As can best be appreciated from FIG. 3, conventional fasteners such as screws 23, 25 extend through respective holes 11 and 13 formed through end frame member 20 in alignment with similar holes 15 and 17 formed in side frame members 18 and 16. Ornamental plugs or caps 22 and 24 are provided to cover the heads of the screws 23 and 25 when in an assembled condition. End frame member 14 is similarly secured to side frame members 16 and 18 through the use of screws 27 and 29 extending through respective aligned apertures 31, 35 and 33, 37. Ornamental plugs or end caps 26 and 28 cover the heads of screws 27 and 29. Front end frame member 20 includes a downwardly extending neck portion 32 provided with cylindrical apertures 49 and 51 dimensioned for the reception of conventional dowel pins 41 and 43. An elongated body member 34 possesses an upper end face provided with cooperating bores 45 and 47 also dimensioned and disposed for the reception of dowel pins 41 and 43. Accordingly, the upper end of body member 34 is substantially permanently secured to the neck portion 32 of front end frame member 20 via dowels 41, 43 and conventional glue. Elongated body member 34 includes on a front surface two longitudinally extending spaced parallel rail members 36 and 38 defining a central recessed mounting channel 40. A bottom or lower box frame assembly 42 forms a substantial mirror image of the upper or top box frame assembly 12, and includes end frame members 44 and 50 connected in spaced parallel relation by side frame members 46 and 48. End frame member 44 is secured to side frame member 48 by engagement of a screw 57 in aligned apertures 61 and 65. End frame member 44 is similarly secured to side frame member 46 by engagement of screw 59 in aligned aperture 63 and 67. Ornamental plugs or caps 56 and 58 cover the heads of screws 57 and 59 in an assembled condition. A front end frame member 50 of the lower box frame assembly 42 is secured to side frame member 48 by engagement of screw 77 in aligned apertures 73 and 69. Front end frame member 50 is similarly secured to side frame member 46 by engagement of screw 79 in aligned apertures 75 and 71. The heads of screw 77 and 79 are covered in an assembled condition by ornamental plugs or caps 52 and 54. The front end frame member 50 of lower box frame assembly 42 includes an upwardly extending neck 62 having an upwardly facing end face provided with spaced apertures 74 and 76 dimensioned and disposed for engagement with conventional dowel pins 70 and 72. The downwardly directed bottom end face of elongated body member 34 is similarly provided with apertures 78 and 80 for engagement with the opposite ends of dowel pins 70 and 72. Accordingly, dowel pins 70 and 72, in conjunction with conventional glue, substantially permanently secure the lower end of elongated body member 34 to front end frame member 50.

As can be appreciated from FIGS. 4 through 8, the bannister attachment 10 of the present invention may be quickly and easily installed on the end post E of a bannister B of the type including a top rail or hand rail R supported by a plurality of posts P. In order to effect such selectively removable mounting, ornamental plugs or end caps 22 and 24 are removed to provide access to the heads of screws 23 and 24, as can be best appreciated with reference to FIGS. 6 and 8. Screws 23 and 25 are then removed from engagement with respective apertures 11, 15 and 13, 17, in order to separate upper box frame assembly 12 at the juncture of front end frame member 20 with side frame members 16 and 18. The box frame assembly 12 is then disposed around the upper rectangular portion of the bannister end post E, and screws 23 and 25 are reinstalled. The bottom box frame assembly 42 is mounted adjacent the bottom rectangular portion of the end post E in a precisely analogous manner.

Figure 5:
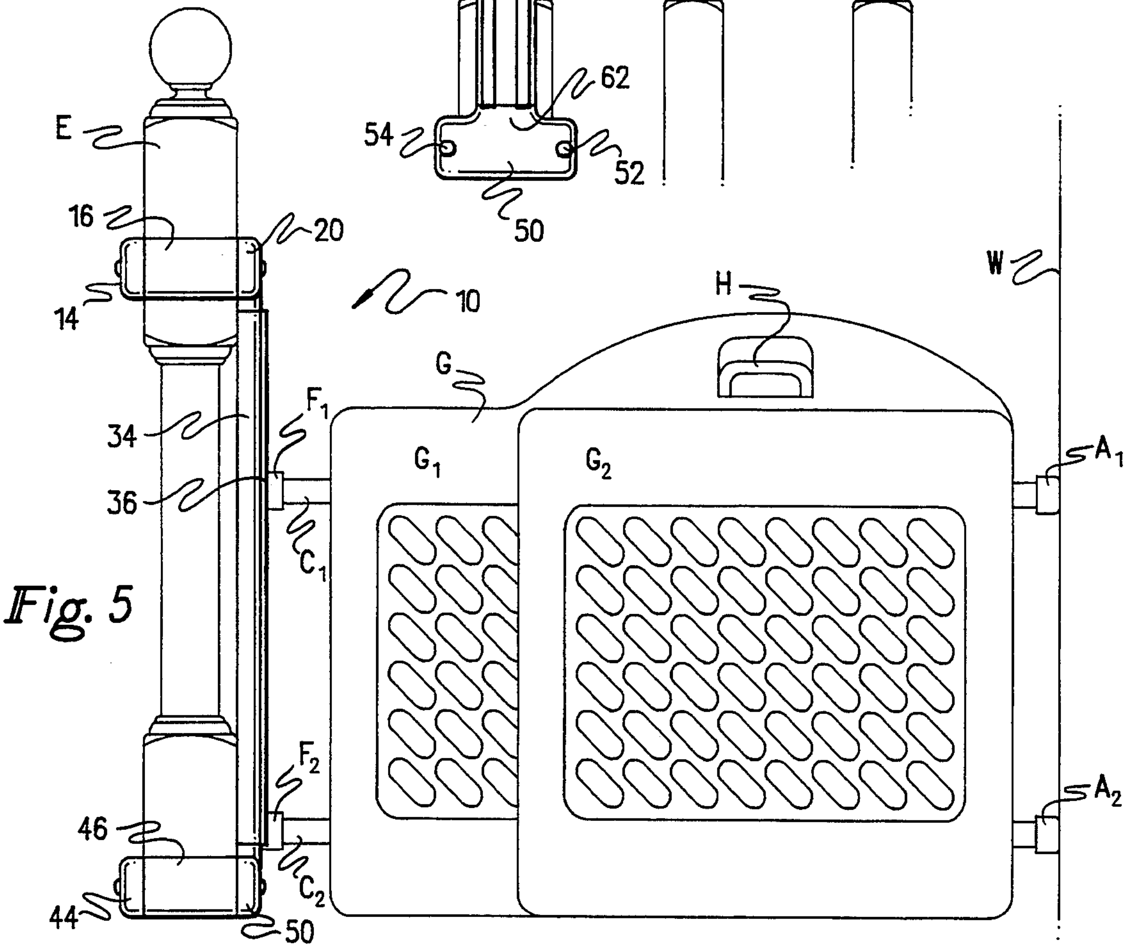
FIG. 5 is a side elevational view illustrating the bannister attachment of the present invention installed on a bannister end post and utilized in conjunction with the mounting of a conventional child safety gate.
Figure 6:
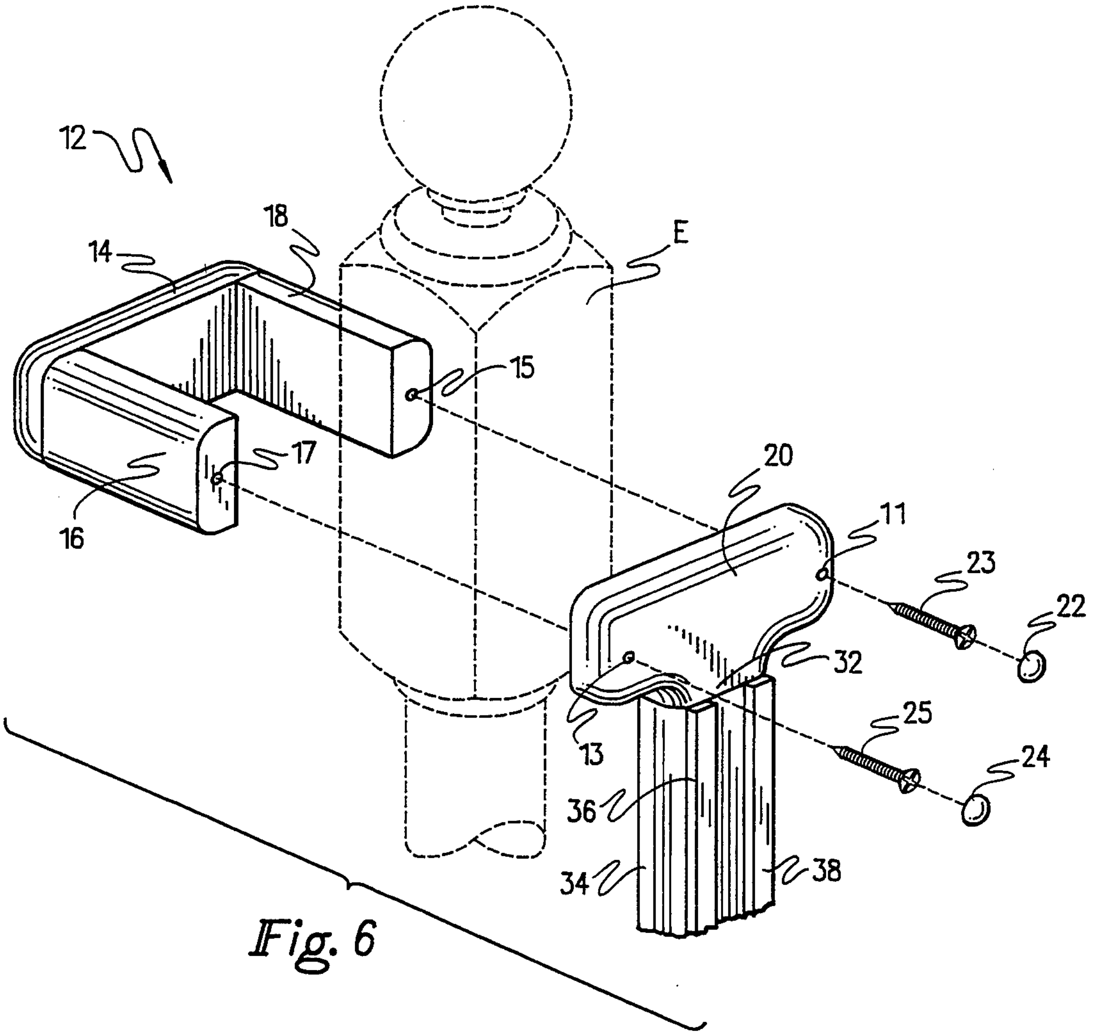
FIG. 6 is an exploded perspective detail view illustrating the manner of mounting the bannister attachment of the present invention on the end post of a bannister.
Figure 7:
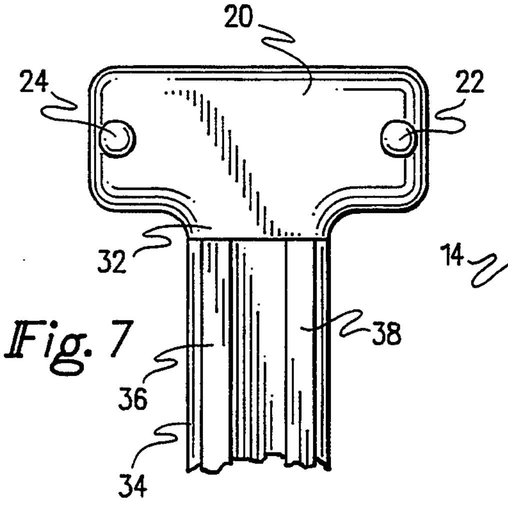
FIG. 7 is a partial elevational detail view illustrating the longitudinally extending mounting rails forming a recessed channel for reception of child safety gate extensible abutment feet.
Figure 8:
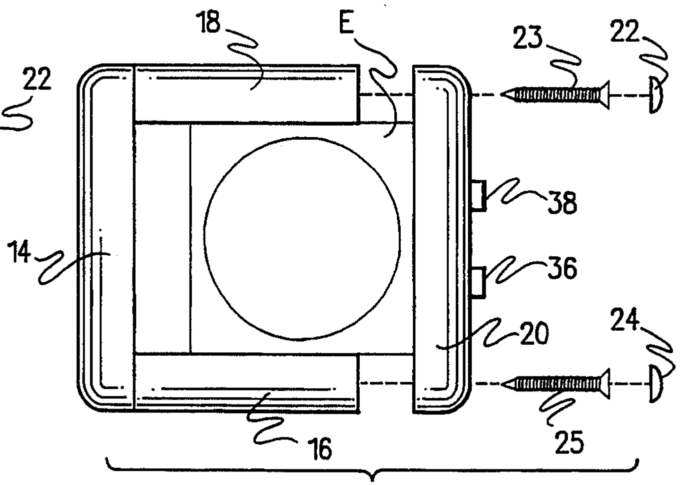
FIG. 8 is a top plan exploded detail view illustrating the manner of mounting the bannister attachment of the present invention on the end post of a bannister.

As shown in FIG. 5, the conventional child safety gate G includes adjustable overlying panels G1 and G2. Abutment feel A1 and A2 extend in fixed relation from an outer side edge of panel G2 for non-marring engagement with the surface of a wall W. Extensible columns C1 and C2 extend laterally from the outer side edge of panel G1 and terminate in abutment feet F1 and F2. The longitudinally extending rail members 36 and 38, as shown for example in FIG. 1, are separated to an extent such that the rectangular feet F1 and F2 are dimensioned for close conforming engagement with in recessed channel 40. The child safety gate G includes a handle mechanism H which is operative upon manual manipulation to selectively extend and retract columns C1 and C2 in order to clamp the gate G between elongated body member 34 and wall surface W. This child safety gate is of a conventional construction and is widely available under the trademark "FISHER PRICE".

Accordingly, it can now be appreciated that the bannister attachment 10 of the present invention allows the use of this widely available and extremely popular type of child safety gate G on stairways terminating at an upper or lower end in an irregularly shaped bannister end post E. While the box frame assemblies 12 and 42 have been described with reference to use on a bannister end post possessing rectangular upper and lower portions, it should be understood that the present invention may be easily modified for use with end posts possessing cylindrical or other irregularly shaped upper and lower end portions. The essential inventive features of the present invention are the provision of a body member having surfaces dimensioned for conforming engagement with the extensible or fixed abutment feet extending from the side edges of the child safety gate, in conjunction with the provision of one or more clamping assemblies for securing the body member to a post of a bannister or other stairway railing.

The various structural frame components of the bannister attachment 10 of the present invention may be formed from a wide variety of different materials, for example wood, plastic, etc. within the scope of the present invention. Additionally, various different ornamental patterns and configurations may also be employed.

In addition to providing a convenient and stable mounting for child safety gates, the bannister attachment of the present invention functions to protect bannisters from damage due to contact with children's toys and shoes, due to the partial surrounding of the he bannister end post by the attachment. Also, the rounded corners of the attachment provide protection against injury to a child, as contrasted with the sharp corners found on many bannister end posts.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. In combination with a bannister post, a bannister attachment for mounting a laterally extensible child safety gate including at least one abutment foot to said bannister post, said bannister attachment comprising:

an elongated body member possessing at least one surface facing away from said bannister and being dimensioned and disposed for engagement with at least one abutment foot of a child safety gate, said body member spanning a central portion of said bannister post in substantially parallel overlying relation;

a first mounting assembly connected to an upper end of said body member and disposed in engagement with an upper end portion of said bannister post; and a second mounting assembly connected to a lower end of said body member and disposed in engagement with a lower end portion of said bannister post.

2. The combination of claim 1, wherein said body member includes at least one recessed portion dimensioned and disposed for engagement with at least one abutment foot of a child safety gate.

3. The combination of claim 1, wherein said body member includes elongated substantially parallel spaced rail members defining a recessed channel dimensioned and disposed for engagement with at least one abutment foot of a child safety gate.

4. The combination of claim 1, wherein said first and second mounting assemblies comprise spaced upper and lower box frame clamp assemblies mounting said bannister attachment to said upper and lower portions of said bannister post.

5. The combination of claim 1, wherein said first and second mounting assemblies each comprise a clamp.

6. A bannister attachment for mounting a laterally extensible child safety gate including at least one abutment foot to a bannister post comprising:

an elongated body member dimensioned to span a central portion of a bannister post in substantially parallel overlying relation and including a mounting surface having substantially parallel spaced longitudinally extending rail members defining a recessed channel dimensioned and disposed for releasable engagement with at least one abutment foot of a child safety gate;

a first mounting assembly secured to an upper end of said body member and including a box frame clamp having spaced parallel end frame members connected by spaced parallel side frame members and dimensioned for engagement around a quadrilateral transverse cross-sectional shaped upper portion of a bannister end post; and a second mounting assembly secured to a lower end of said body member and including a box frame clamp having spaced parallel end frame members connected by spaced parallel side frame members and dimensioned for engagement around a quadrilateral transverse cross-sectional shaped lower portion of a bannister end post.

7. A bannister attachment for mounting a laterally extensible child safety gate including at least one abutment foot to a bannister post comprising:

body means dimensioned to span a central portion of a bannister post in substantially parallel overlying relation and including a mounting surface configured for releasable engagement with at least one abutment foot of a child safety gate;

first mounting means connected to an upper end of said body means and including means for engagement with an upper end portion of a bannister post; and second mounting means connected to a lower end of said body means and including means for engagement with a lower end portion of a bannister post.

8. The bannister attachment of claim 7, wherein said body means includes at least one recessed portion dimensioned and disposed for engagement with at least one abutment foot of a child safety gate.

9. The bannister attachment of claim 7, wherein said body means includes an elongated recessed channel dimensioned and disposed for engagement with at least one abutment foot of a child safety gate.

10. The bannister attachment of claim 7, wherein said body means includes substantially parallel spaced longitudinally extending rail members defining a recessed channel dimensioned and disposed for engagement with at least one abutment foot of a child safety gate.

11. The bannister attachment of claim 7, wherein said body means comprises an elongated vertically extending body member and said first and second mounting means comprise spaced upper and lower mounting assemblies disposed at opposite ends of said body member.

12. The bannister attachment of claim 7, wherein said body means comprises an elongated vertically extending body member and said first and second mounting means comprise spaced upper and lower box frame clamp assemblies disposed at opposite ends of said body member and dimensioned and disposed for selective mounting to respective upper and lower portions of a bannister post.

13. The bannister attachment of claim 7, wherein said first mounting means comprises a box frame clamp assembly including spaced parallel end frame members connected by spaced parallel side frame members and dimensioned for engagement around a quadrilateral transverse cross-sectional shaped upper portion of a bannister end post.

14. The bannister attachment of claim 7, wherein said second mounting means comprises a box frame clamp assembly including spaced parallel end frame members connected by spaced parallel side frame members and dimensioned for engagement around a quadrilateral transverse cross-sectional shaped lower portion of a bannister end post.

15. The bannister attachment of claim 7, wherein said first mounting means includes a clamp.

16. The bannister attachment of claim 15, wherein said clamp comprises a box frame assembly.

17. The bannister attachment of claim 7, wherein said first and second mounting means each include a clamp.

18. The bannister attachment of claim 17, wherein said clamp comprises a box frame assembly.

19. The bannister attachment of claim 7, wherein said second mounting means includes a clamp.

20. The bannister attachment of claim 19, wherein said clamp comprises a box frame assembly.

* * * * *